(No Model.) 3 Sheets—Sheet 1.

A. SMETHURST.
POTATO DIGGER.

No. 520,902. Patented June 5, 1894.

Witnesses
T. A. Connor
Gales P. Moore

Inventor
Aaron Smethurst
by C. E. Sturtevant
his Attorney (No Model.) 3 Sheets—Sheet 3.

A. SMETHURST.
POTATO DIGGER.

No. 520,902. Patented June 5, 1894.

Witnesses
L. A. Conner
Gales P. Moore

Inventor
Aaron Smethurst
by C. S. Sturtevant,
his Attorney

THE NATIONAL LITHOGRAPHING COMPANY,
WASHINGTON, D. C.

UNITED STATES PATENT OFFICE.

AARON SMETHURST, OF BOUNTIFUL, UTAH TERRITORY, ASSIGNOR OF ONE-HALF TO CHARLES H. ROBERTS, OF SAME PLACE.

POTATO-DIGGER.

SPECIFICATION forming part of Letters Patent No. 520,902, dated June 5, 1894.

Application filed July 29, 1893. Serial No. 482,171. (No model.)

*To all whom it may concern:*

Be it known that I, AARON SMETHURST, a citizen of the United States, residing at Bountiful, in the county of Davis, Territory of Utah, have invented certain new and useful Improvements in Potato-Diggers, of which the following is a description, reference being had to the accompanying drawings, and to the letters of reference marked thereon.

My invention relates to potato diggers, the object being to combine in a compact and convenient form, a machine in which the potatoes are unearthed, cleaned of the dirt which clings to them upon being taken from the soil, and then conveyed to bags or dumped into a wagon or other convenient receptacle.

The invention consists in the various matters hereinafter described and claimed, and is illustrated in the accompanying drawings, in which—

Figure 1:
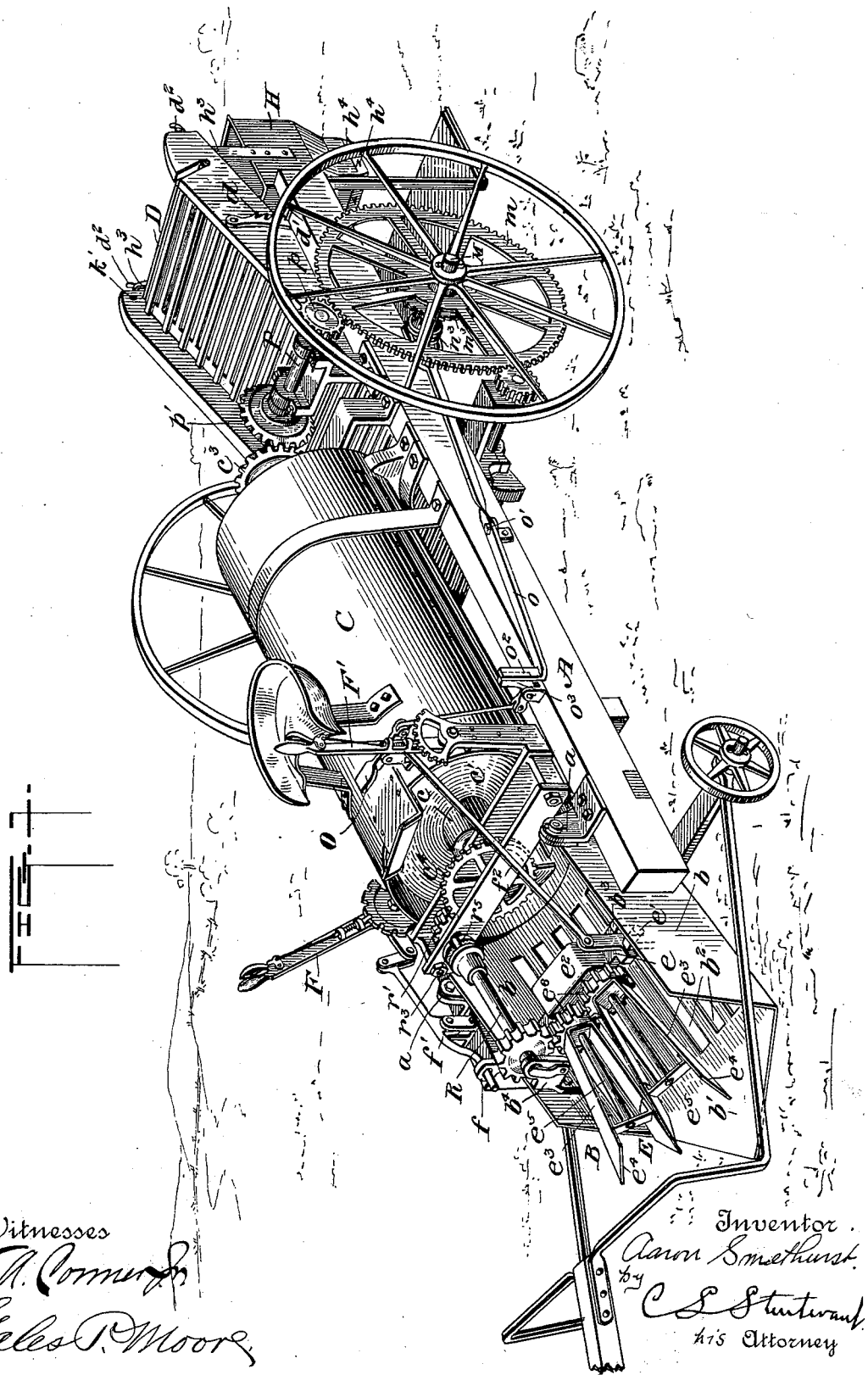
Figure 2:
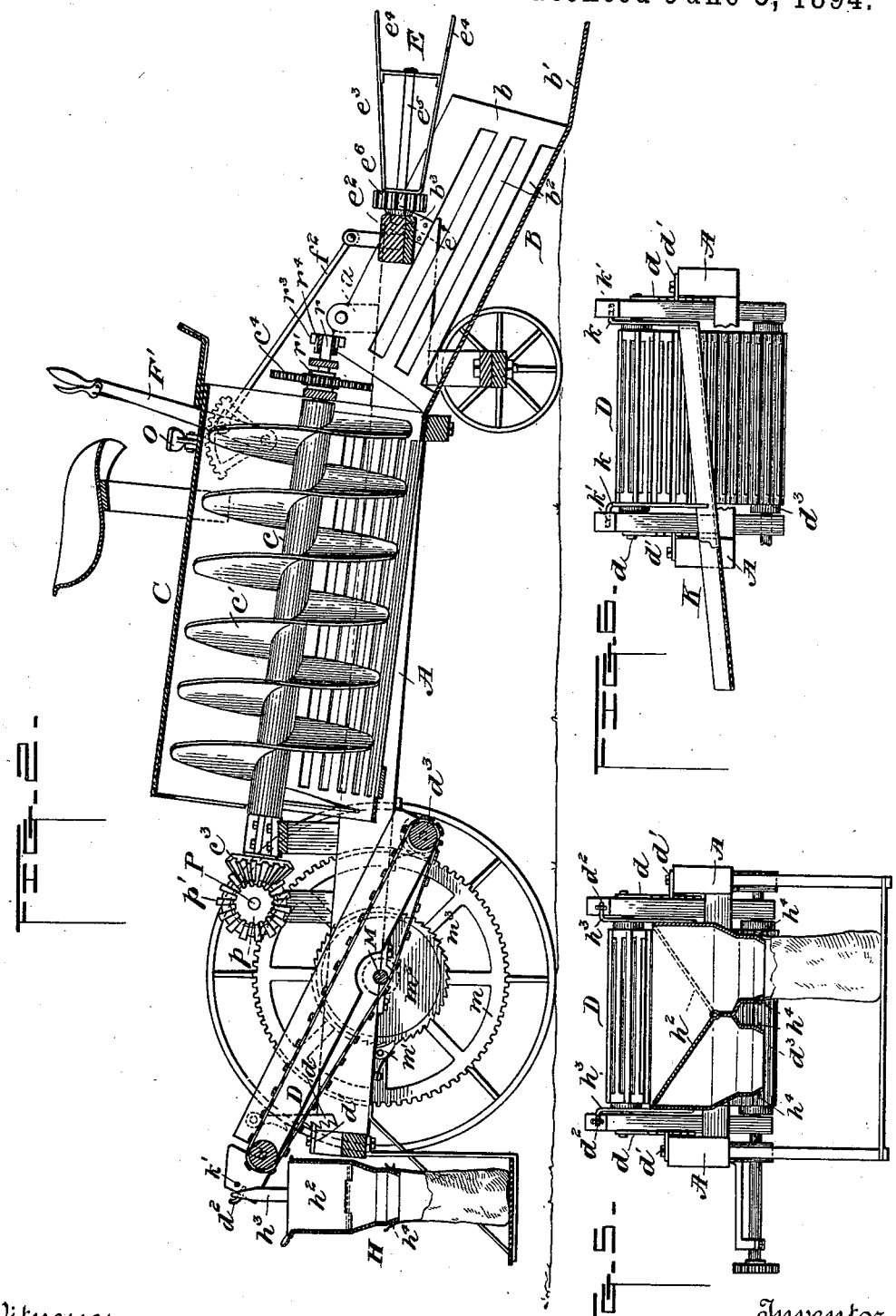
Figure 3:
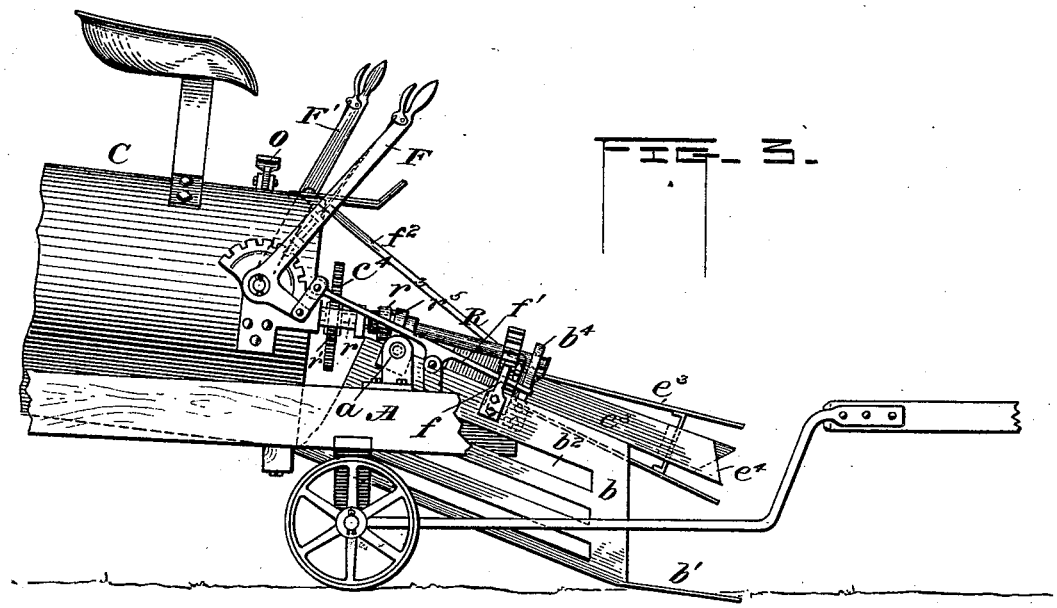
Figure 4:
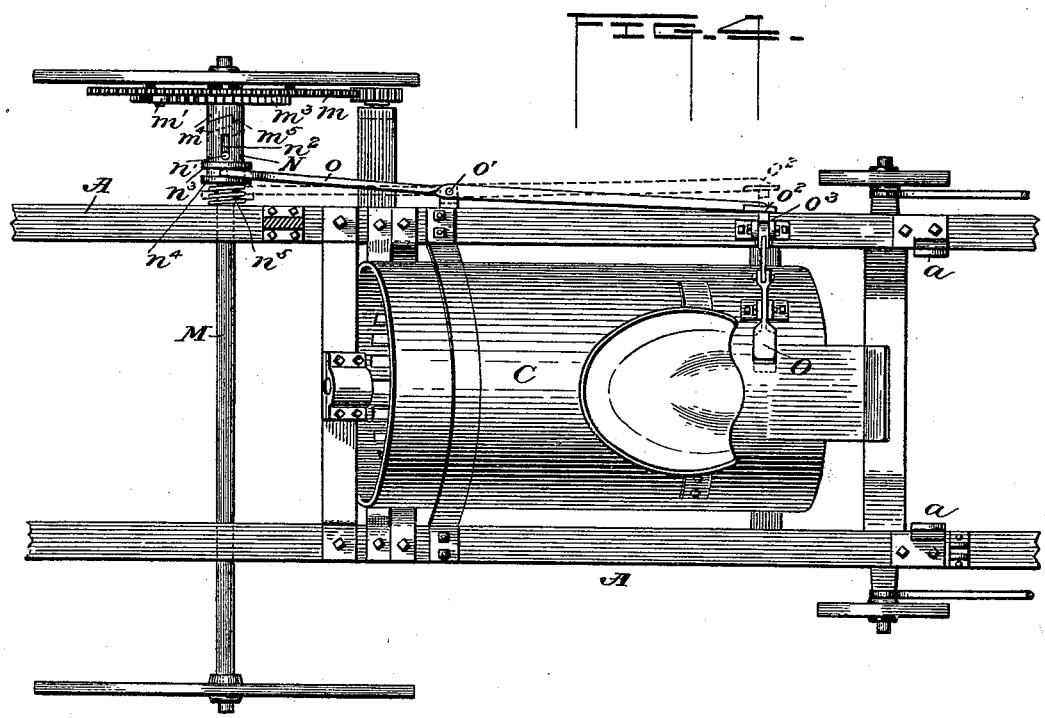

Figure 1 is a perspective view of a digger constructed in accordance with my invention. Fig. 2 is a longitudinal section of the same. Fig. 3 is a perspective detail of the digging head. Fig. 4 is a detail of the clutch operating mechanism whereby the working parts of the machine are thrown into and out of connection with the wheels. Fig. 5 is a view of the rear end of the machine showing the bag holder attachment; and Fig. 6 is a view of the rear of the machine showing instead of the bag holder, a chute by which the potatoes are delivered into a wagon or other suitable receptacle.

In the drawings, A represents the framework upon which the mechanism is supported, B a digging head by which the potatoes are unearthed, C a drum in which they are cleaned of the dirt which adheres to them upon being taken from the ground, and D a conveyer by which they are deposited in suitable bags, or, as shown in Fig. 6, into a chute leading to a wagon or other suitable receptacle.

Referring to the digging head, $a, a$, are plates fastened upon the frame, and to these is pivoted a trough $b$ provided at its front with a plow point $b'$, and having its bottom and part of its sides provided with slots $b^2$ through which dirt, small potatoes, pebbles, &c., will fall as the material unearthed is passing to the drum C.

Much impediment is offered the working of the plow by reason of vines and weeds along the potato rows, and in order to remove these, I have provided the vine clearer E. This consists of a plate $e$ extending across the plow-carrying trough, and pivoted thereto by means of lugs $e'$ removably fitting in the bearings $b^3$ upon the sides of the trough $b$. Upon this plate $e$ is formed a struck-up portion $e^2$ to which are swiveled the clearers $e^3$, these clearers consisting of pointed plates $e^4$ rigidly secured to shafts $e^5$ connected by suitable gears, as the cogs $e^6$.

It is obvious that many contingencies may arise in which it is desired to raise or lower either the plow point or the vine clearer, or both. In order to accomplish these results, I have provided upon one side of the plow trough a plate $f$ in which is formed a suitable opening for the passage of the rod $f'$, and this by means of the lever F places the plow under the control of the driver, the plow swinging freely on the pivots passing into the plates $a, a$. The vine clearer being pivoted in the bearings $b^3$, it is raised and lowered by the lever F' and rod $f^2$.

After being taken from the ground, the potatoes pass up the trough $b$ into the drum C through which is a shaft $c$ carrying a worm conveyer $c'$. The bottom of the drum, like the bottom of the trough, is slotted as shown, so that during the passage of the potatoes along its length, gravel, dirt, &c., loosened by the action of the conveyer, will sift through. From the drum C the potatoes are deposited upon the elevator D. This is capable of vertical adjustment by reason of its being pivoted at its lower end and having its upper ends provided with swinging toothed bars $d$ adapted to engage with suitable plates, as $d'$. Upon the elevator frame I fasten hooks $d^2$ adapted to support a bag holder H which I have illustrated in detail in Fig. 5. This holder consists of a hopper $h$ divided into two compartments by the partition $h'$ to which is hinged a plate $h^2$ adapted to be swung from one side of the hopper to the other, thus opening and closing either compartment at the will of the operator who stands upon the platform G. Hooks $h^3$ extend from the sides of the bag holder and engage with the hooks $d^2$ upon the elevator, while points $h^4$ to which the bags are attached during the operation of filling, are provided upon the outside of the funnels forming the outlets of the compartments of the hopper. Other means for receiving the potatoes may be provided, e. g., as shown in Fig. 6, a trough K may be fastened in a suitable position to receive articles from the elevator, as by means of the hooks $k$ secured in the openings $k'$ formed in the sides of the elevator, the other end of the trough leading into a wagon traveling at the side of the digger.

Motion is transmitted to the various parts of my machine as follows: Upon the rear axle M are loosely journaled the cog wheel $m$ provided with the pawl $m'$, and the circular plate $m^2$ upon the periphery of which are formed the teeth $m^3$ with which the pawl $m'$ engages. From the plate $m^2$ also projects the sleeve $m^4$ upon which are formed the cam shoulders $m^5$, the wheel $m$, plate $m^2$ and sleeve $m^4$ being prevented from lateral movement in any well known manner. Fitting over the axle is another sleeve N provided with cam shoulders $n$ adapted to engage the shoulders upon the sleeve $m^4$, and, in order to throw these shoulders into and out of engagement, having lateral movement by reason of the lugs $n'$ projecting into the elongated slots $n^2$. Two face-plates $n^3$ and $n^4$ are secured to the sleeve N between which fits a lever $o$ for laterally moving the sleeve, while bearing at one end against the frame A and at the other against the inner face plate is a spring $n^5$ tending to normally hold the shoulders upon the two sleeves in engagement. The lever $o$ is pivoted at $o'$ and provided at its free end with a plate $o^2$ against which bears the bell-crank $o^3$ operated by the foot lever O. It will thus be seen that normally the sleeve N is in engagement with the sleeve $m^4$ and the pawl $m'$ with the teeth $m^3$, so that as the machine moves forward the axle M carries with it the sleeve N and through the connections just mentioned, causes the revolution of the cog wheel $m$, while should the machine be moved backward, the pawl $m'$ and teeth $m^3$ will allow the cog wheel to remain motionless. Journaled in suitable bearings is a shaft P one end of which is provided with a cog wheel $p$ meshing with the cogs in the wheel $m$, while the other end carries a bevel cog $p'$ meshing with a corresponding gear $c^3$ upon the end of the shaft $c^2$ which extends through the drum C and carries the conveyer $c$. To the other end of this shaft is secured another gear $c^4$ meshing with the gear $r'$ upon the counter-shaft $r$. This counter-shaft carries a plate $r^2$ provided with a central depression $r^3$ and peripheral slots $r^4$. A plate $b^4$ upon the side of the trough $b$ is also provided with an opening $b^5$, and journaled in this opening and the depression $r^3$ is a shaft R carrying at its upper end a plate from which project lugs $r^5$ fitting into the peripheral slots $r^4$, while at its lower end it carries a gear meshing with one of the gears $e^6$. This arrangement of parts provides for the shaft R practically two universal joints by reason of which the trough $b$ and vine clearer E may be raised and lowered without disturbing the mechanism by which the latter is rotated.

Motion is imparted to the elevator D by extending the shaft of the lower roller $d^3$ and providing it with a gear at a suitable point to mesh with the cog wheel $m$, this shaft being supported in suitable bearings.

The machine being pulled forward, the axle M through the mechanism before described, imparts motion to the vine clearer E, the conveyer $c$, and the elevator D. When it is desired to commence digging, the operator by using the levers F, F' adjusts the plow and vine clearer, when the vines will be torn from the row, the potatoes unearthed, and, after passing up the trough into the drum, they will be cleaned, and then delivered upon the elevator to be deposited in bags or otherwise as may be desired.

Having thus described my invention, what I claim as new, and desire to secure by Letters Patent, is—

1. A potato digger comprising a frame, a plow pivoted to said frame, a catch extending upward from said plow, a rod pivoted to the body of the machine and passing through said catch, and means whereby the rod may be raised and lowered, thus correspondingly moving the plow; substantially as described.

2. A potato digger comprising a frame, a plow pivoted to said frame, a plate extending upward from said plow, a second plate upon said first plate, an opening in said second plate, a lever pivoted to the body of the machine, and a rod secured to said lever and passing through the opening in the second plate whereby the plow may be raised and lowered; substantially as described.

3. A potato digger comprising a frame, a plow pivoted thereto, a plate extending upward from said plow, a second plate upon said first plate, an opening in said second plate, a lever pivoted upon the body of the machine, and a rod pivoted to the body of the machine, one end of said rod being pivoted to the lever and the other end passing through the opening in the second plate whereby the plow may be raised and lowered; substantially as described.

4. A potato digger comprising a frame, a plow secured thereto, a vine clearer carried by said plow, a counter shaft upon the body of the machine, means for imparting motion to said counter shaft, a second shaft having a universal joint with said counter shaft and supported near the vine clearer, and connections between the vine clearer and said second shaft; substantially as described.

5. A potato digger comprising a frame, a plow secured thereto, plates extending upward from the plow, a cross bar secured to said plates, a shaft journaled upon said cross bar, tearing arms secured to said shaft, a bearing upon one of the plates extending from the plow, a counter shaft secured to the body of the machine, means for imparting motion to said counter shaft, and a second shaft in gear with the shaft upon the cross bar, said second shaft resting at one end in the bearing upon the plate extending from the plow and at the other end forming a universal joint with the counter shaft; substantially as described.

6. A potato digger comprising a frame, a trough secured thereto, a plow attached to said trough, a cross bar secured to the sides of said trough, a shaft journaled to said cross bar, tearing arms upon said shaft, a bearing upon one side of the trough, a counter shaft supported upon the body of the machine, a plate upon said counter shaft, peripheral slots in said plate, a shaft journaled at one end in the bearing upon the trough and at the other having lugs fitting in the peripheral slots in the plate, said shaft also carrying a gear connected to a corresponding gear upon the shaft secured to the cross bar, and means for imparting motion to the counter shaft; substantially as described.

In witness whereof I have hereunto signed my name in the presence of two subscribing witnesses.

AARON SMETHURST.

Witnesses:
 ORM M. BAKER,
 CHARLES D. BRODBECK.